(12) United States Patent
Barrat et al.

(10) Patent No.: US 10,936,579 B2
(45) Date of Patent: *Mar. 2, 2021

(54) VERIFYING DATA STRUCTURE CONSISTENCY ACROSS COMPUTING ENVIRONMENTS

(71) Applicant: International Business Machines Corporation, Armonk, NY (US)

(72) Inventors: Frederic Barrat, Cugnaux (FR);
Khalid Filali-Adib, Austin, TX (US);
Perinkulam I. Ganesh, Round Rock, TX (US); John M. McConaughy, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 404 days.

This patent is subject to a terminal disclaimer.

(21) Appl. No.: 15/893,594

(22) Filed: Feb. 10, 2018

(65) Prior Publication Data
US 2018/0165325 A1    Jun. 14, 2018

Related U.S. Application Data

(63) Continuation of application No. 13/766,754, filed on Feb. 13, 2013, now Pat. No. 9,892,154, which is a continuation of application No. 13/670,392, filed on Nov. 6, 2012, now abandoned.

(51) Int. Cl.
*G06F 16/23* (2019.01)
*G06F 11/36* (2006.01)

(52) U.S. Cl.
CPC ........ *G06F 16/2365* (2019.01); *G06F 11/366* (2013.01); *G06F 11/3624* (2013.01)

(58) Field of Classification Search
CPC .................................................. G06F 16/2365
USPC ........................................................... 707/690
See application file for complete search history.

(56) References Cited

U.S. PATENT DOCUMENTS 7,464,064 B1 * 12/2008 Smith ...................... G06F 30/00
                                                                706/47
7,809,898 B1 * 10/2010 Kiselev ............... G06F 11/2064
                                                                711/111
2003/0041290 A1 * 2/2003 Peleska .............. G05B 19/0428
                                                                714/47.1

(Continued)

FOREIGN PATENT DOCUMENTS

EP            2372520           5/2011

*Primary Examiner* — Joshua Bullock
(74) *Attorney, Agent, or Firm* — James L. Baudino

(57) ABSTRACT

According to one aspect of the present disclosure, a method and technique for verifying data structure consistency across computing environments includes computing a first signature for a data structure of an application subject to checkpointing corresponding to a first computing environment residing on a server computer. A second signature for the data structure of the application corresponding to a second computing environment residing on a client computer is computed. The first and second signatures are compared to determine whether a change to the data structure exists. Responsive to a lack of change to the data structure based on the comparison, a mobility operation is enabled for the application between the server computer and the client computer.

17 Claims, 4 Drawing Sheets

(56) References Cited

U.S. PATENT DOCUMENTS

| | | | | |
|---|---|---|---|---|
| 2003/0210701 | A1* | 11/2003 | Saiki | H04L 43/00 370/401 |
| 2004/0246902 | A1* | 12/2004 | Weinstein | H04L 45/54 370/238 |
| 2005/0005077 | A1* | 1/2005 | Heinrich | G06F 21/572 711/154 |
| 2005/0086562 | A1* | 4/2005 | Demsky | G06F 11/0751 714/100 |
| 2006/0168558 | A1* | 7/2006 | de Seabra e Melo | G06F 9/451 717/105 |
| 2006/0218144 | A1* | 9/2006 | Randal | G06F 11/0751 |
| 2008/0016076 | A1* | 1/2008 | Seeger | G06F 16/10 |
| 2009/0106758 | A1* | 4/2009 | Giampaolo | G06F 16/1865 718/101 |
| 2012/0095971 | A1* | 4/2012 | Shyam | G06F 16/1774 707/690 |
| 2012/0102454 | A1 | 4/2012 | Burghard et al. | |
| 2012/0317134 | A1* | 12/2012 | Bourbonnais | G06F 16/2365 707/769 |

* cited by examiner

VERIFYING DATA STRUCTURE CONSISTENCY ACROSS COMPUTING ENVIRONMENTS

BACKGROUND

In some data processing environments, an application and/or workload may be migrated from one computing environment to another computing environment. For example, operating system virtualization is a technology which can divide a single host (e.g., computer, server, etc.), into multiple parts, or partitions, each running a separate instance, or image, of an operating system. The instances of the operating systems are separate, or isolated, from each other in some ways. For example, the instances of the operating systems have separate file systems, separate users, separate applications, and separate processes. However, the instances of the operating systems may also share some resources of the host. For example, the instances of the operating systems can share the memory, the kernel, the processors, the hard drives, and/or other software, firmware, and/or hardware of the host. Thus, each instance of the operating system can look and feel like a separate server or machine from the perspective of its users. These instances of the operating system are commonly referred to as "virtual" or "virtualized" operating systems.

A software workload partition (WPAR) provides isolation of software services, applications, and administration utilizing software-defined boundaries within an instance of an operating system. For example, a WPAR is a software implementation of operating system virtualization. More specifically, a WPAR is a software partition that is created from, runs under, and shares the resources of a managing instance of a base operations system. Typically, the WPARs and the managing instance share an identical operating system (e.g., identical version, etc.). However, in some instances, a WPAR may be associated with a legacy operating system (i.e., an earlier version of the base operating system).

When migrating an application and/or workload, ensuring consistent operation after migration may include a checkpointing operation. The checkpointing process saves and validates the status of the current application/workload in one computing environment and then starts the application/workload in the other computing environment based on the saved checkpoint state.

BRIEF SUMMARY

According to one aspect of the present disclosure a method and technique for verifying data structure consistency across computing environments is disclosed. The method includes computing a first signature for a data structure of an application subject to checkpointing corresponding to a first computing environment residing on a server computer. A second signature for the data structure of the application corresponding to a second computing environment residing on a client computer is computed. The first and second signatures are compared to determine whether a change to the data structure exists. Responsive to a lack of change to the data structure based on the comparison, a mobility operation is enabled for the application between the server computer and the client computer.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
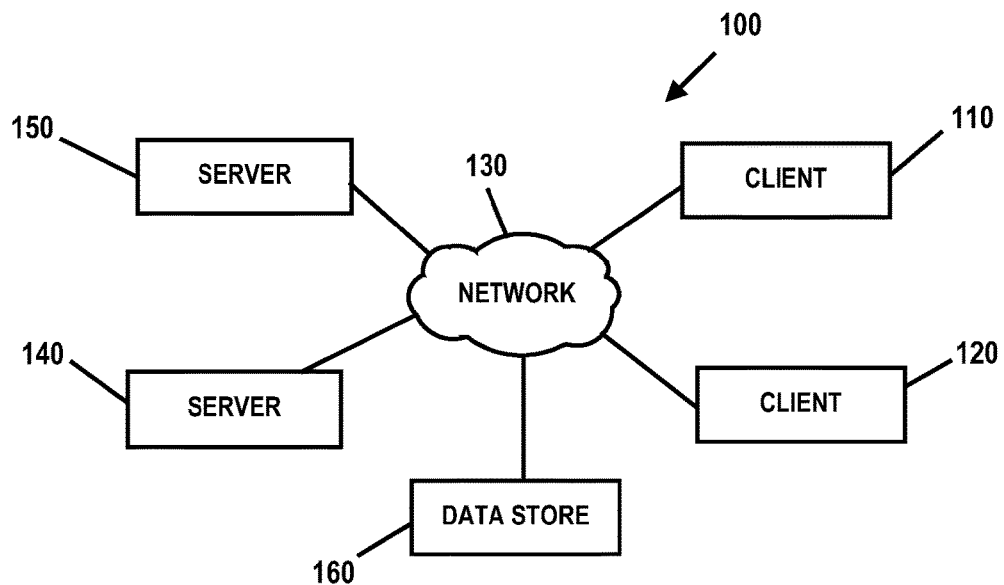
FIG. 1 is an embodiment of a network of data processing systems in which the illustrative embodiments of the present disclosure may be implemented.

Embodiments of the present disclosure provide a method, system and computer program product for verifying data structure consistency across computing environments. For example, in some embodiments, the method and technique includes: generating a first signature for a data structure corresponding to a first computing environment; generating a second signature for the data structure corresponding to a second computing environment; comparing the first and second signatures; and responsive to a disparity between the first and second signatures, indicating a change to the data structure between the first and second computing environments. Thus, embodiments of the present disclosure enable the detection of changes to nested data structures. Embodiments of the present disclosure utilize debugging information generated by compiling data structure files to identify and expand nested data structure elements of the data structure. A checksum or signature is then generated based on the expanded data structure files which may be compared to signatures generated for corresponding data structures associated with a different computing environments to identify any inconsistencies between the different computing environments for the data structure. Thus, for example, in the case of different operating system versions, verification of application and/or workload mobility between different operating system versions may be performed by verifying that checkpoint data structures corresponding to one version of an operating system may be read and/or interpreted by a different version of the operating system. Embodiments of the present disclosure may also be used to detect changes in nested data structures across other types of computing environment applications (e.g., between a client and a server, between two programs, etc.).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
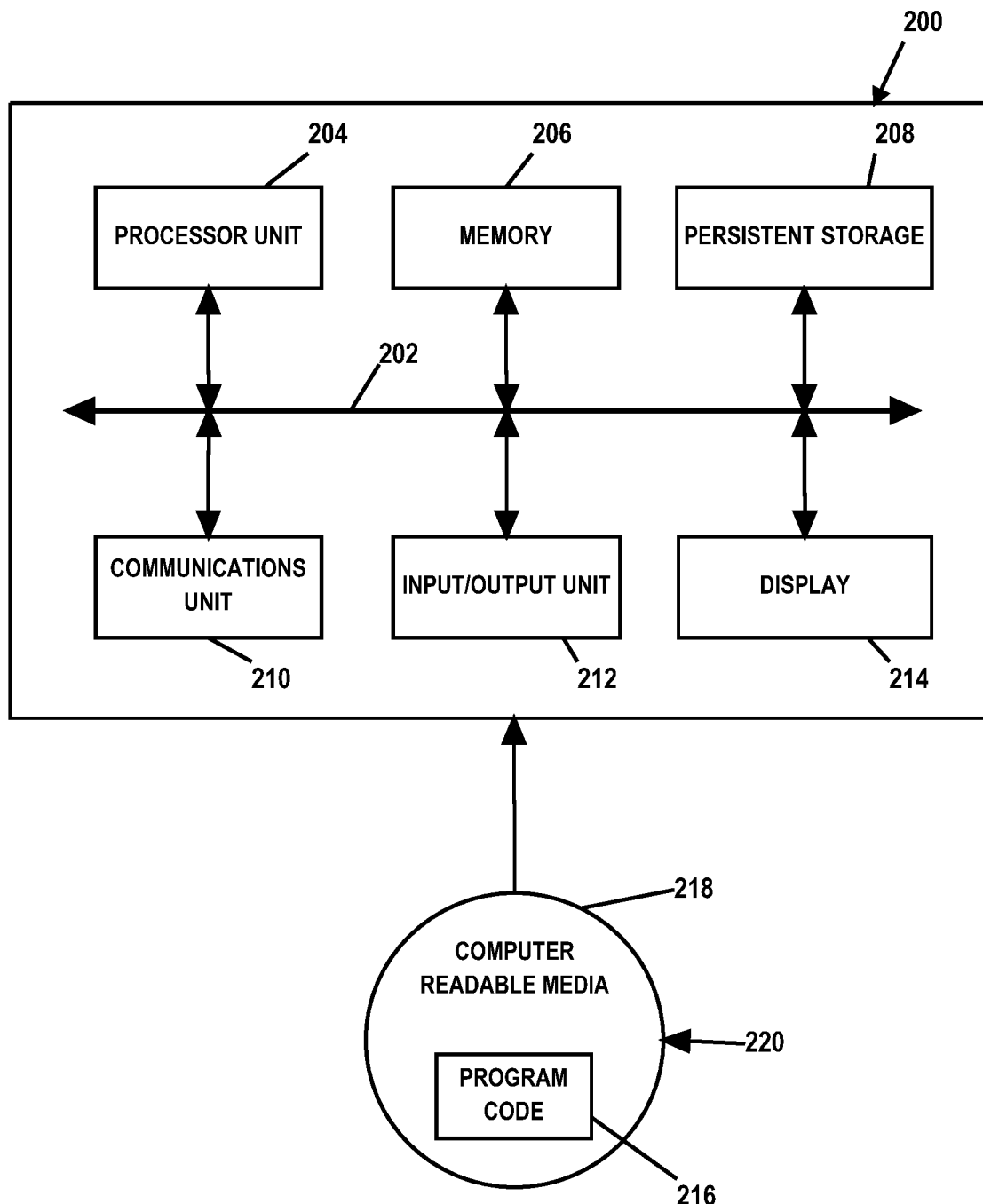
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for verifying data structure consistency across computing environments according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
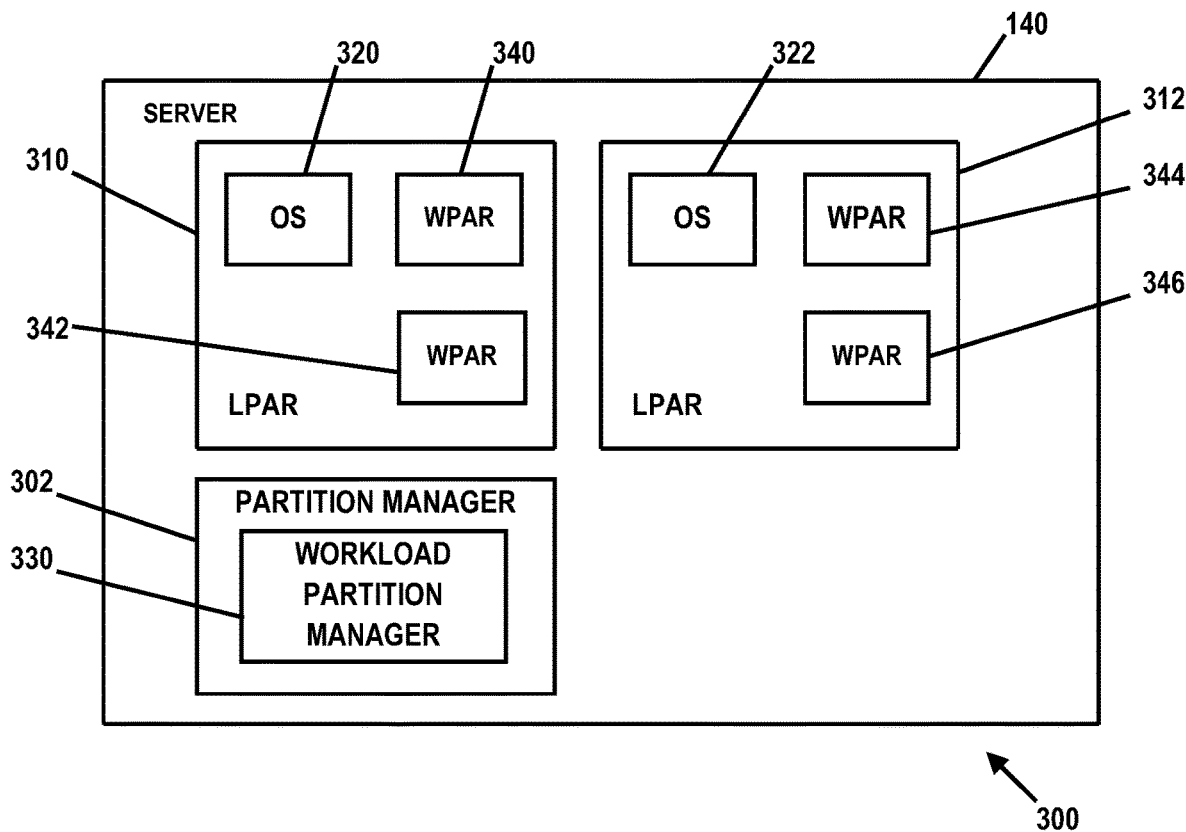
FIG. 3 is an embodiment of a data processing system depicting different computing environments in which the illustrative embodiments of the present disclosure may be implemented.

FIG. 3 is an illustrative embodiment of a data processing system 300 depicting different computing environments in which embodiments of the present disclosure may implemented and/or utilized. System 300 may be implemented on data processing systems or platforms such as, but not limited to, servers 140 and/or 150, clients 110 and/or 120, or at other data processing system locations. For example, in the embodiment illustrated in FIG. 3, an embodiment of system 300 is implemented on server 140. It should be understood that embodiments of the present disclosure may be implemented elsewhere such as, but not limited to, client 110 and/or server 150. Server 140 is configured to implement software such as processes, applications, operating systems, etc. In FIG. 3, server 140 includes a partition manager 302. Partition manager 302 may be executing in server 140 and may create one or more logical partitions ("LPARs") 310 and 312 within the server 140 environment. LPARs are assigned a subset of a computer's hardware resources (i.e., a subset of the hardware underlying the server environment) and are virtualized within the server environment as a separate computer. Resources such as processor capacity, memory, or any other type of resource may be assigned to a particular LPAR. Each LPAR has its own virtual operating system (OS) instance (e.g., operating systems 320 and 322 in respective LPARs 310 and 312) and associated files, allowing for multiple operating systems to be simultaneously executing within the server 140 environment.

In FIG. 3, partition manager 302 includes a workload partition manager 330. Workload partition manager 330 may create and manage one or more workload partitions ("WPARs") to be executing within a logical partition. WPARs are virtual operating system instances which may independently behave like an operating system image. Workload partition manager 330 may be wholly or partially a component of partition manager 302 (as depicted in FIG. 3) or may be an entirely separate module. In FIG. 3, LPAR 310 includes WPARs 340 and 342, and LPAR 312 includes WPARS 344 and 346; however, it should be understood that the quantity of WPARS created in any one of LPARs may vary. Partition manager 302 and/or workload partition manager 330 may be implemented in any suitable manner using known techniques that may be hardware-based, software-based, or some combination of both. For example, partition manager 302 and/or workload partition manager 330 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

Operating system virtualization or WPARs may be used to organize and isolate workloads in accordance with business requirements, organizational guidelines, etc., while utilizing available equipment. For instance, an administrator can create different WPARs for a marketing department database and associated applications ("marketing database workload"), an accounting department database and associated applications ("accounting database workload"), and legal department electronic mail server ("legal e-mail workload"). Instead of using three different servers, the resources of a single server can be used to satisfy the needs of the three workloads. Each WPAR presents to the respective hosted workload (i.e., processes, application(s) of the workload) as an instance of an operating system with its own namespace and process environment. Typically, WPARs are associated with the same version of the main or base operating system that is executed in the system (e.g., within a single host computer system, or within a single LPAR). In other words, the operating system environment of the WPAR is limited to the version of the base operating system of the underlying kernel and device driver software of the system. WPARs associated with the same version of the global or base operating system can be referred to as "native WPARs." However, in some instances, WPARs can be associated with an earlier version or legacy version of the base operating system and can be referred to as "versioned WPARs." Thus, each WPAR and/or LPAR may comprise different operating system versions. Accordingly, when moving a workload and/or application from one operating system version or level to a different operating system version or level (e.g., migrating a WPAR from one LPAR to another LPAR), interpretation of data by the newer version of the operating system is an important consideration. For example, when moving a workload/application from one operating system version or level to a different operating system version or level, an important consideration is ensuring data written by an older version of an operating system (e.g., checkpoint data structures) can be interpreted by the newer version of the operating system. If, for example, a nested data structure element of a checkpoint data structure has undergone modification between different operating system versions, the modified checkpoint data structure may adversely impact the mobility of the workload/application. System 300 depicts an illustrative example of a data processing system which may include different operating system versions; however, it should be understood that embodiments of the present disclosure are not limited to environments containing LPARs and/or WPARs. Further, embodiments of the present disclosure may be used to verify data structure consistency in applications other than operating system versions (e.g., between a client and a server, between two programs, or other applications where consistency of nested data structures is desired)

Figure 4:
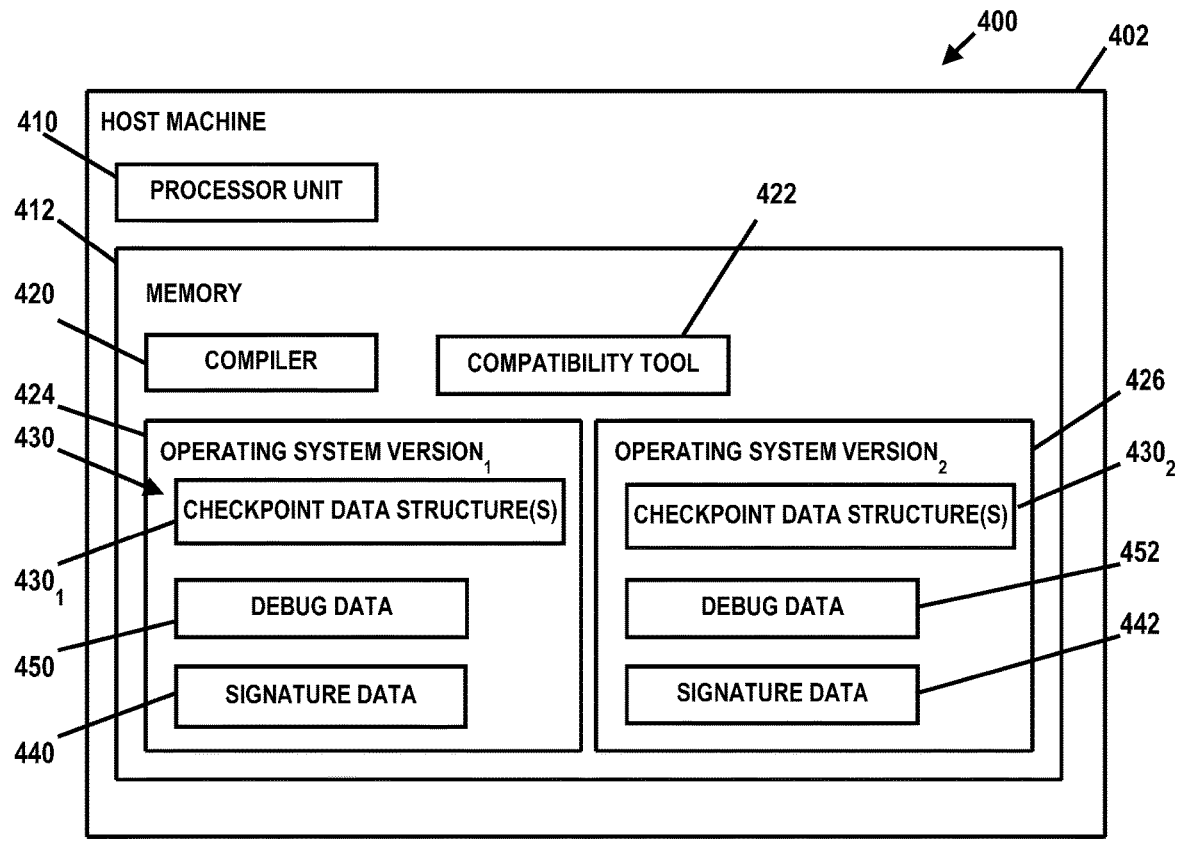
FIG. 4 is a diagram illustrating an embodiment of a data processing system for verifying data structure consistency across computing environments in which illustrative embodiments of the present disclosure may be implemented.

FIG. 4 is an illustrative embodiment of a system 400 for verifying data structure consistency across computing environments. System 400 may be implemented on data processing systems or platforms such as, but not limited to, servers 140 and/or 150, clients 110 and/or 120, or at other data processing system locations. For example, in the embodiment illustrated in FIG. 4, system 400 comprises a host machine 402 having a processor unit 410 and a memory 412. In the illustrated embodiment, memory 412 includes a compiler 420 and a compatibility tool 422. Compiler 420 and/or compatibility tool 422 may be implemented in any suitable manner using known techniques that may be hardware-based, software-based, or some combination of both. For example, compiler 420 and/or compatibility tool 422 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

For ease of description and illustration, embodiments of the present disclosure are described in connection with FIG. 4 pertaining to verifying checkpoint data structures across two different versions of an operating system; however, it should be understood that embodiments of the present disclosure may be used in different applications. Thus, for an exemplary checkpoint data structure consistency verification, depicted in FIG. 4 are two different versions of an operating system (OS), indicated as operating system $version_1$ 424 and operating system $version_2$ 426. Operating system $version_1$ 424 and operating system $version_2$ 426 are illustrated to represent two different versions of an operating system. It should be understood that operating system $version_1$ 424 and operating system $version_2$ 426 may comprise source code used to generate a version of an operating system (as opposed to a running instance of an operating system). The operations and/or functions described herein may be performed for verifying checkpoint data structures on one host machine corresponding to a particular version of an OS while the same operations and/or functions may be performed for verifying the checkpoint data structures on a different host machine corresponding to a different version of the operating system.

Embodiments of the present disclosure enable the identification of disparities and/or inconsistencies for a data structure between different computing environments (e.g., a checkpoint data structure(s) 430 between different operating system versions). For example, in FIG. 4, one or more checkpoint data structures $430_1$ associated with and/or corresponding to OS 424 and corresponding checkpoint data structures $430_2$ associated with and/or corresponding to OS 426 are illustrated. Compatibility tool 422 is configured to generate and/or compute a signature or checksum value for a particular checkpoint data structure for one version of an OS (represented as signature data 440 in FIG. 4) and generate and/or compute a signature or checksum value for the particular checkpoint data structure for a different version of the OS (represented as signature data 442 in FIG. 4). The generated signatures may then be compared (e.g., by compatibility tool 422 or other processing element) to determine whether an inconsistency is present for the particular checkpoint data structure across different versions of the OS. In the illustrated embodiment, memory 412 also includes debug data 450 and debug data 452. As will be described in greater detail below, debug data 450 comprises debugging information generated by compiler 420 resulting from compiling checkpoint data structure(s) $430_1$, and debug data 452 comprises debugging information generated by compiler 420 resulting from compiling checkpoint data structure(s) $430_2$. Debug data 450 and 452 is used to identify nested data structure elements to enable the expanding of such data structure elements such that signature data 440 and 442 is derived on the expanded checkpoint data structures.

In operation, for example, a source code file (SCF) may be used to describe a number of checkpoint data structures. Compiler 420 may be run with debug options activated such that when running with the debug options activated, compiler 420 generates additional detailed information corresponding to the various data structure elements for a particular checkpoint data structure. Thus, for example, compiler 420 may be used to generate an object file (OBF) from compiling the SCF such that the OBF contains the detailed debugging information. The detailed debugging information may indicate that certain checkpoint data structures contain nested data structure elements. As an example, consider that the SCF includes the following:

```
struct a {
    int c;
    int d;
}
struct b {
    struct a
    int f;
}
``` where "struct a" represents one checkpoint data structure containing integers "c" and "d", and "struct b" represents another checkpoint data structure containing "struct a" and integer "f." In this illustrative example, "struct b" includes a nested data structure element (i.e., "struct a"). By compiling SCF with compiler 420 to include detailed debugging information, compatibility tool 422 may read the OBF and identify the nested data structure elements within a particular checkpoint data structure and expand such nested data structure elements such that a signature is generated based on the fully expanded checkpoint data structure.

Figure 5:
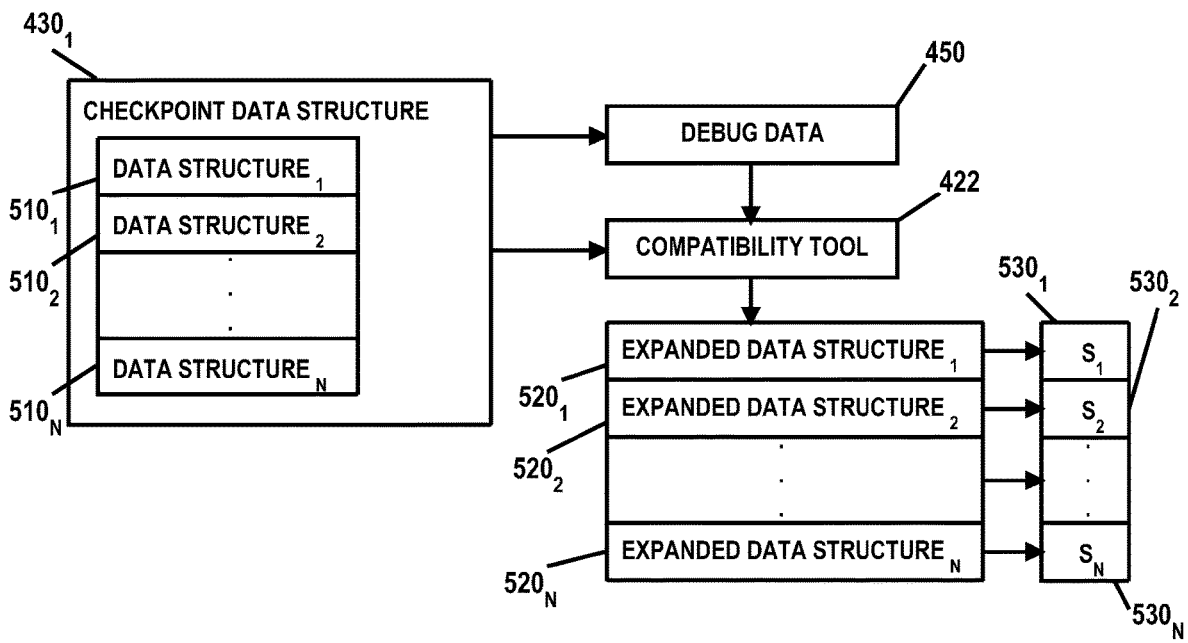
FIG. 5 is a diagram illustrating an embodiment of data structure consistency verification processing according to the present disclosure.

FIG. 5 is a diagram illustrating an embodiment of checkpoint data structure consistency processing according to the present disclosure for verification between different operating system versions as described in connection with FIG. 4. For ease of description and illustration, FIG. 5 is directed toward the processing of checkpoint data structures associated with OS 424; however, it should be understood that a similar process is performed for checkpoint data structures corresponding to OS 426 to facilitate the comparison of respective signature data 440 and 442. In the illustrated embodiment, a checkpoint data structure 430 (e.g., in the form of a source code file) may include information identifying a number of different checkpoint data structures $510_1$-$510_n$. Compiler 420 is used to compile checkpoint data structure 430 and output debug data 450. Debug data 450 is input to compatibility tool 422 along with a listing of the different checkpoint data structures $510_1$-$510_n$ (e.g., in the form of a listing by name or other identifier, derived from the source code file, or otherwise). Compatibility tool 422 evaluates debug data 450 for each checkpoint data structure $510_1$-$510_n$ and identifies whether any particular checkpoint data structure $510_1$-$510_n$ contains any nested data structure elements. If so, compatibility tool 422 expands such nested data structure elements to generate an expanded checkpoint data structure $520_1$-$520_n$ corresponding to each respective checkpoint data structure $510_1$-$510_n$ (e.g., which may be output as a temporary file) such that the expanded checkpoint data structure $520_1$-$520_n$ files contain the basic data structure element types for a particular checkpoint data structure $510_1$-$510_n$. It should be understood that in some instances, a particular checkpoint data structure may not contain any nested data structure elements such that a further expansion of the checkpoint data structure is unnecessary. For each checkpoint data structure $510_1$-$510_n$, compatibility tool 422 generates a checksum or signature $530_1$-$530_n$ (e.g., based on expanded checkpoint data structure $520_1$-$520_n$. The signature data 440 (e.g., signatures $530_1$-$530_n$) can thereafter be compared to signature data 442 generated for corresponding checkpoint data structures $430_2$ associated with OS 426.

Figure 6:
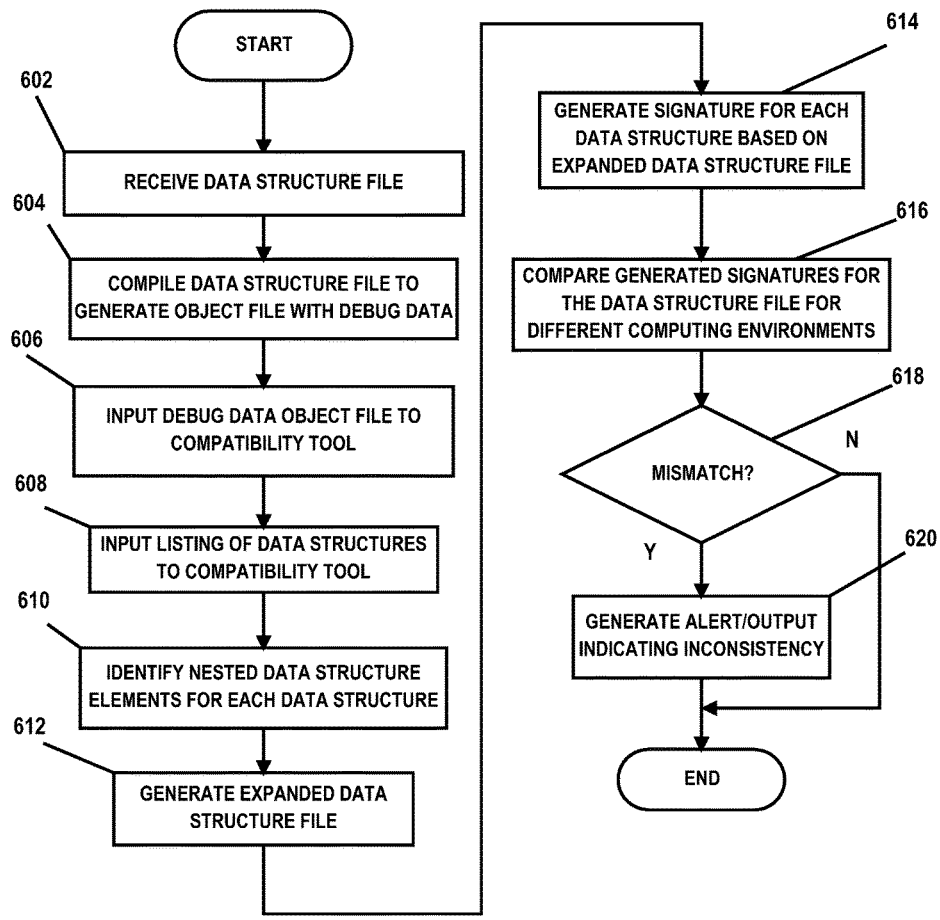
FIG. 6 is a flow diagram illustrating an embodiment of a method for verifying data structure consistency across computing environments according to the present disclosure.

FIG. 6 is a flow diagram illustrating an embodiment of a method for verifying data structure consistency across different computing environments. The method begins at block 602, where a data structure file is received (e.g., a source code file containing one or more data structures). At block 604, compiler 420 compiles the data structure file and generates debugging data (e.g., in the form of an object file) from the data structure file. At block 606, the debugging data object file is input to the compatibility tool 422. At block 608, an identification of the data structures in the particular data structure file is input to the compatibility tool 422.

At block 610, compatibility tool 422 analyzes the debugging data object file to identify any nested data structure elements for the data structure. At block 612, compatibility tool 422 generates and outputs an expanded data structure including any base data structure elements as well as expended data structure elements. At block 614, compatibility tool 422 generates a checksum or signature based on the contents of the expanded data structure file. At block 616, a comparison of the generated signature is performed with a signature generated for the data structure file corresponding to a different computing environment (e.g., associated with different operating system versions, between a client and a server, between two programs, etc.). At decisional block 618, a determination is made whether a mismatch or inconsistency exists between compared signatures. If not, the method ends as to the particular data structure. If a mismatch exists between compared signatures for a particular data structure at decisional block 618, the method proceeds to block 620, where an alert or other type of indication of an inconsistency of a data structure between computing environments is generated (e.g., by compatibility tool 422 or another processing element).

Thus, embodiments of the present disclosure enable the detection of changes to nested data structures. Embodiments of the present disclosure utilize debugging information generated by compiling data structure files to identify and expand nested data structure elements of the data structure. A checksum or signature is then generated based on the expanded data structure files which may be compared to signatures generated for corresponding data structures associated with a different computing environments to identify any inconsistencies between the different computing environments for the data structure. Thus, for example, in the case of different operating system versions, verification of application and/or workload mobility between different operating system versions may be performed by verifying that checkpoint data structures corresponding to one version of an operating system may be read and/or interpreted by a different version of the operating system.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
computing a first signature for a data structure of an application subject to checkpointing corresponding to a first computing environment residing on a server computer;
computing a second signature for the data structure of the application corresponding to a second computing environment residing on a client computer;
comparing the first and second signatures;
determining whether a change to the data structure exists based on the comparison; and
responsive to a lack of change to the data structure based on the comparison, enabling a mobility operation for the application between the server computer and the client computer.

2. The method of claim 1, further comprising:
expanding the data structure to identify nested data structure elements; and
generating the first and second signatures based on the expanded data structure.

3. The method of claim 1, further comprising:
generating debug data from compiling the data structure; and
generating the first and second signatures based on the debug data.

4. The method of claim 1, further comprising:
generating debug data from compiling the data structure;
outputting an expanded data structure based on the debug data; and
generating the first and second signatures based on the expanded data structure.

5. The method of claim 1, further comprising:
generating debug data from compiling the data structure;
identifying each data structure element from the debug data;
responsive to identifying that an identified data structure element includes a nested data structure element, expanding the nested data structure element;
outputting an expanded data structure including the identified data structure elements and expanded nested data structure elements; and
generating the first and second signatures based on the expanded data structure.

6. The method of claim 1, wherein:
generating the first signature corresponds to the data structure in the first computing environment associated with a first version of an operating system; and
generating the second signature corresponds to the data structure in the second computing environment associated with a second version of the operating system.

7. A method, comprising:
generating first debug data for a data structure of an application corresponding to a first computing environment;
generating second debug data for the data structure of the application corresponding to a second computing environment;
generating a first expanded data structure based on the first debug data;
generating a second expanded data structure based on the second debug data;
generating a first signature based on the first expanded data structure;
generating a second signature based on the second expanded data structure;
comparing the first and second signatures to verify consistency of the data structure between the first and second computing environments; and
based on a verification of consistency, enabling a mobility operation of the application between the first and second computing environments.

8. The method of claim 7, wherein generating the first and second computing environments each have a different version of an operating system.

9. The method of claim 8, further comprising identifying nested data structure elements in the respective first and second debug data.

10. The method of claim 9, further comprising expanding an identified nested data structure element for the respective first and second expanded data structures.

11. The method of claim 7, wherein:
generating the first signature corresponds to the data structure in the first computing environment associated with a first version of an operating system; and
generating the second signature corresponds to the data structure in the second computing environment associated with a second version of the operating system.

12. The method of claim 11, wherein comparing the first and second signatures comprises comparing the first and second signatures to verify consistency of the data structure between the first and second versions of the operating system.

13. A method, comprising:
reading, by a compatibility tool, first debug data resulting from compiling a data structure corresponding to a first computing environment;
reading, by the compatibility tool, second debug data resulting from compiling the data structure corresponding to a second computing environment;
determining, by the compatibility tool, whether the first debug data and the second debug data indicate nested data structure elements in the data structure;
responsive to determining that the data structure includes nested data structure elements, expanding, by the compatibility tool, the nested data structure elements to create respective first and second expanded data structures based on the first and second debug data;
generating, by the compatibility tool, a first signature based on the first expanded data structure;
generating, by the compatibility tool, a second signature based on the second expanded data structure; and
validating, by the compatibility tool, data structure compatibility between the first and second computing environments based on an analysis of the first and second signatures.

14. The method of claim 13, further comprising validating, by the compatibility tool, data structure compatibility between a first version of an operating system and a second version of the operating system in the first and second computing environments.

15. The method of claim 13, further comprising generating first and second object files including the respective first and second debug data.

16. The method of claim 15, further comprising compiling a source code file of the data structure to generate the first and second object files.

17. The method of claim 13, further comprising validating, by the compatibility tool, data structure compatibility to enable a mobility operation of a workload from one logical partition to a second logical partition.

* * * * *